United States Patent
Kikuchi et al.

(10) Patent No.: US 8,527,095 B2
(45) Date of Patent: *Sep. 3, 2013

(54) COOLING SYSTEM AND CONTROL METHOD OF COOLING SYSTEM

(75) Inventors: Yoshiaki Kikuchi, Toyota (JP); Yasumitsu Omi, Okazaki (JP); Shinji Wakao, Okazaki (JP); Takenori Tsuchiya, Toyota (JP); Mikio Katashima, Toyota (JP); Kazuhiko Nakashima, Ann Arbor, PA (US); Tetsuya Ishihara, Kariya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 587 days.

This patent is subject to a terminal disclaimer.

(21) Appl. No.: 12/308,256

(22) PCT Filed: Jun. 13, 2007

(86) PCT No.: PCT/JP2007/061928
§ 371 (c)(1),
(2), (4) Date: Apr. 6, 2009

(87) PCT Pub. No.: WO2007/145258
PCT Pub. Date: Dec. 21, 2007

(65) Prior Publication Data
US 2009/0248204 A1    Oct. 1, 2009

(30) Foreign Application Priority Data

Jun. 15, 2006   (JP) ................................ 2006-166474

(51) Int. Cl.
*G05B 15/00*   (2006.01)

(52) U.S. Cl.
USPC ............. 700/275; 318/268; 700/280; 62/241; 62/296; 62/259.2; 62/186; 62/408; 180/68.1; 165/121

(58) Field of Classification Search
USPC ................ 700/275, 280; 318/268; 180/68.1; 165/121; 62/241, 296, 259.2, 186, 408
See application file for complete search history.

(56) References Cited

U.S. PATENT DOCUMENTS 5,490,572 A    2/1996  Tajiri et al.
5,937,664 A *  8/1999  Matsuno et al. ............. 62/259.2
(Continued)

FOREIGN PATENT DOCUMENTS

EP    1 504 949 A1    2/2005
EP    1 983 603 A1    10/2008
(Continued)

OTHER PUBLICATIONS

Mar. 29, 2012 Office Action issued in U.S. Appl. No. 12/295,212.
(Continued)

*Primary Examiner* — Tejal Gami
(74) *Attorney, Agent, or Firm* — Oliff & Berridge, PLC

(57) ABSTRACT

A cooling system constructed to cool down an accumulator mounted on a motor vehicle is herein presented. The cooling system sequentially controls an air blower to restrict the air blow to the accumulator, controls the air blow mode switchover module to switch over the active air blow mode after restriction of the air blow to the accumulator, and controls the air blower to release the restriction of the air blow to the accumulator after the switchover of the active air blow mode by the air blow mode switchover module.

8 Claims, 6 Drawing Sheets

(56) References Cited

U.S. PATENT DOCUMENTS

| | | |
|---|---|---|
| 6,675,597 B2 | 1/2004 | Ieda et al. |
| 6,691,523 B1 | 2/2004 | Sangwan et al. |
| 7,024,871 B2 | 4/2006 | Zhu et al. |
| 7,152,417 B2 | 12/2006 | Morishita et al. |
| 7,348,741 B2 | 3/2008 | Minekawa et al. |
| 7,360,370 B2 | 4/2008 | Shah et al. |
| 7,767,354 B2 | 8/2010 | Saito et al. |
| 2002/0140389 A1 | 10/2002 | Ohki et al. |
| 2003/0080714 A1 | 5/2003 | Inoue et al. |
| 2003/0118891 A1 | 6/2003 | Saito et al. |
| 2003/0209022 A1 | 11/2003 | Ieda et al. |
| 2003/0233839 A1 | 12/2003 | Hirose et al. |
| 2005/0056472 A1 | 3/2005 | Smith et al. |
| 2005/0168180 A1* | 8/2005 | Minekawa et al. ........... 318/268 |
| 2006/0080986 A1 | 4/2006 | Inoue |
| 2006/0186213 A1 | 8/2006 | Carey et al. |
| 2007/0027580 A1 | 2/2007 | Ligtenberg et al. |
| 2007/0033953 A1 | 2/2007 | Gao |
| 2007/0089442 A1 | 4/2007 | Tsuchiya |
| 2007/0144190 A1 | 6/2007 | Temmyo et al. |
| 2007/0178346 A1 | 8/2007 | Kiya et al. |
| 2009/0024252 A1 | 1/2009 | Aridome et al. |
| 2009/0133859 A1 | 5/2009 | Suzuki et al. |
| 2009/0248204 A1 | 10/2009 | Kikuchi et al. |
| 2010/0241308 A1 | 9/2010 | Kikuchi et al. |

FOREIGN PATENT DOCUMENTS

| | | |
|---|---|---|
| JP | A-7-223428 | 8/1995 |
| JP | A-09-086137 | 3/1997 |
| JP | A-2001-291532 | 10/2001 |
| JP | A-2002-211226 | 7/2002 |
| JP | A-2003-279180 | 10/2003 |
| JP | A-2004-001674 | 1/2004 |
| JP | 2004194384 A * | 7/2004 |
| JP | A-2004-194384 | 7/2004 |
| JP | A-2004-255960 | 9/2004 |
| JP | A-2005-93434 | 4/2005 |
| JP | A-2005-178406 | 7/2005 |
| JP | A-2005-254974 | 9/2005 |
| JP | A-2005-306197 | 11/2005 |
| JP | A-2005-343377 | 12/2005 |
| JP | A-2006-111203 | 4/2006 |
| JP | A-2006-143183 | 6/2006 |
| WO | WO 2005/092650 A1 | 10/2005 |

OTHER PUBLICATIONS

Nov. 26, 2012 Office Action issued in U.S. Appl. No. 12/295,212.
May 19, 2011 Office Action issued in U.S. Appl. No. 12/294,487.
Sep. 27, 2011 Office Action issued in U.S. Appl. No. 12/294,487.
Jan. 11, 2012 Advisory Action issued in U.S. Appl. No. 12/294,487.
Feb. 15, 2012 Office Action issued in U.S. Appl. No. 12/294,487.
May 23, 2012 Notice of Allowance issued in U.S. Appl. No. 12/294,487.
U.S. Appl. No. 12/295,212 in the name of Suzuki filed on Sep. 29, 2008.
U.S. Appl. No. 12/294,487 in the name of Kikuchi filed on Sep. 25, 2008.

* cited by examiner

COOLING SYSTEM AND CONTROL METHOD OF COOLING SYSTEM

TECHNICAL FIELD

The present invention relates to a cooling system configured to cool down an accumulator mounted on a motor vehicle, as well as to a control method of such a cooling system.

BACKGROUND ART

One proposed structure of a cooling system mounted on a motor vehicle changes over the position of a damper to change over the air blow pathway for cooling down the battery between an air flow path of taking in the air inside or outside of a passenger compartment of the motor vehicle and blowing the intake air to a battery and an air flow path of taking in the air cooled down by an evaporator and blowing the cooled intake air to the battery (see, for example, Patent Documents 1 and 2). This prior art cooling system changes over the position of the damper based on the temperature of the battery, in order to keep the battery operated in an adequate temperature range.

Patent Document 1: Japanese Patent Laid-Open No. 2005-93434
Patent Document 2: Japanese Patent Laid-Open No. 2005-254974

DISCLOSURE OF THE INVENTION

In the cooling system of this prior art structure, the operations of a blower fan and the damper for blowing the air to the battery to cool down the battery cause unusual noise, such as wind roar. In general, the driver or the other passengers are not specifically informed of the operations of these components to cool down the battery. The occurrence of unusual noise in the course of cooling down the battery thus makes the driver and the other passengers feel odd and uncomfortable.

In the cooling system and the control method of the cooling system, there would thus be a demand for preventing the driver and the other passengers from feeling odd and uncomfortable by the occurrence of unusual noise in the course of cooling down a battery or an accumulator.

The present invention accomplishes at least part of the demand mentioned above and the other relevant demands by the following configurations applied to the cooling system and the control method of the cooling system.

According to one aspect, the present invention is directed to a cooling system constructed to cool down an accumulator mounted on a motor vehicle. The cooling system includes: an air blower provided to have multiple air blow modes of taking in the air from different locations and blowing the intake air to the accumulator; an air blow mode switchover module configured to change over a status of each air flow path between an open position and a closed position in each of the multiple air blow modes and thereby switch over an active air blow mode between the multiple air blow modes; and a controller configured to perform an air blow restriction changeover control, in response to a switchover demand of the active air blow mode during air blow to the accumulator via the air blow mode switchover module. The air blow restriction changeover control sequentially controls the air blower to restrict the air blow to the accumulator, controls the air blow mode switchover module to switch over the active air blow mode after restriction of the air blow to the accumulator, and controls the air blower to release the restriction of the air blow to the accumulator after the switchover of the active air blow mode by the air blow mode switchover module.

The cooling system according to this aspect of the invention has the air blow mode switchover module arranged to change over the status of each air flow path between the open position and the closed position in each of the multiple air blow modes of taking in the air from different locations and blowing the intake air to the accumulator. In response to a switchover demand of the active air blow mode during the air blow to the accumulator via the air blow mode switchover module, the cooling system of the invention performs the air blow restriction change over control. The air blow restriction changeover control sequentially controls the air blower to restrict the air blow to the accumulator, controls the air blow mode switchover module to switch over the active air blow mode after restriction of the air blow to the accumulator, and controls the air blower to release the restriction of the air blow to the accumulator after the switchover of the active air blow mode by the air blow mode switchover module. This arrangement reduces the potential unusual noise, such as wind roar, occurring in the course of a switchover of the air blow mode by the air blow mode switchover module and thus effectively prevents the driver and the other passengers from feeling odd and uncomfortable.

In one preferable embodiment, the cooling system of the above aspect further has: a noise level detection-estimation module configured to detect or estimate a noise level in a passenger compartment of the motor vehicle. The controller performs the air blow restriction changeover control in response to the detected or estimated noise level of less than a preset reference level, while controlling the air blow mode switchover module to switch over the active air blow mode without restriction of the air blow to the accumulator in response to the detected or estimated noise level of not less than the preset reference level. This arrangement desirably prevents the driver and the other passengers from feeling odd and uncomfortable by utilizing masking effects of the noise in the passenger compartment on unusual noise, such as wind roar, occurring due to the operations of the air blow mode switchover module. In this preferable embodiment, the noise level detection-estimation module may have a vehicle speed detector configured to detect a vehicle speed of the motor vehicle, and the noise level detection-estimation module may detect or estimate the noise level in the passenger compartment, based on the detected vehicle speed. In this preferable embodiment, when the cooling system is mounted on a motor vehicle equipped with an internal combustion engine, the noise level detection-estimation module may have an engine rotation speed detector configured to detect a rotation speed of the internal combustion engine, and the noise level detection-estimation module may detect or estimate the noise level in the passenger compartment, based on the detected rotation speed of the internal combustion engine. In this preferable embodiment, furthermore, when the cooling system is mounted on a motor vehicle equipped with an audio output module configured to output sound with an adjustable volume in the passenger compartment, the noise level detection-estimation module may detect or estimate the noise level in the passenger compartment, based on a volume adjustment condition of the audio output module.

In the cooling system according to the above aspect of the invention, the motor vehicle may be equipped with an air conditioner configured to condition the air in a passenger compartment of the motor vehicle, and the multiple air blow modes may include a first air blow mode of taking in the air inside or outside of the passenger compartment of the motor vehicle and directly blowing the intake air to the accumulator and a second air blow mode of taking in the air cooled down by the air conditioner and blowing the cooled intake air to the accumulator.

In the cooling system according to the above aspect of the invention, the cooling system may further include a temperature-relevant parameter detector configured to detect a temperature-relevant parameter reflecting temperature of the accumulator, and the switchover demand of the active air blow mode may be made based on the detected temperature-relevant parameter.

According to another aspect, the present invention is directed to a control method of a cooling system, the cooling system having: an air blower provided to have multiple air blow modes of taking in the air from different locations and blowing the intake air to an accumulator mounted on a motor vehicle; and an air blow mode switchover module configured to change over a status of each air flow path between an open position and a closed position in each of the multiple air blow modes and thereby switch over an active air blow mode between the multiple air blow modes, in response to a switchover demand of the active air blow mode during air blow to the accumulator via the air blow mode switchover module, the control method sequentially controlling the air blower to restrict the air blow to the accumulator, controlling the air blow mode switchover module to switch over the active air blow mode after restriction of the air blow to the accumulator, and controlling the air blower to release the restriction of the air blow to the accumulator after the switchover of the active air blow mode by the air blow mode switchover module.

The control method according to this aspect of the invention controls the cooling system having the air blow mode switchover module arranged to change over the status of each air flow path between the open position and the closed position in each of the multiple air blow modes of taking in the air from different locations and blowing the intake air to the accumulator. In response to a switchover demand of the active air blow mode during the air blow to the accumulator via the air blow mode switchover module, the control method of the invention performs the air blow restriction changeover control. The air blow restriction changeover control sequentially controls the air blower to restrict the air blow to the accumulator, controls the air blow mode switchover module to switch over the active air blow mode after restriction of the air blow to the accumulator, and controls the air blower to release the restriction of the air blow to the accumulator after the switchover of the active air blow mode by the air blow mode switchover module. This arrangement reduces the potential unusual noise, such as wind roar, occurring in the course of a switchover of the air blow mode by the air blow mode switchover module and thus effectively prevents the driver and the other passengers from feeling odd and uncomfortable.

In the control method according to this aspect of the invention, the control method may perform the air blow restriction changeover control in response to a noise level in a passenger compartment of the motor vehicle of less than a preset reference level, while controlling the air blow mode switchover module to switch over the active air blow mode without restriction of the air blow to the accumulator in response to the noise level in the passenger compartment of not less than the preset reference level. This arrangement desirably prevents the driver and the other passengers from feeling odd and uncomfortable by utilizing masking effects of the noise in the passenger compartment on unusual noise, such as wind roar, occurring due to the operations of the air blow mode switchover module. In the control method according to this aspect of the invention, the control method may perform the control in a motor vehicle equipped with an internal combustion engine, and may determine the noise level in the passenger compartment based on a rotation speed of the internal combustion engine and controls the air blow mode switchover module to switch over the active air blow mode. Furthermore, in the control method according to this aspect of the invention, the control method may perform the control in a motor vehicle equipped with an audio output device configured to output sound with an adjustable volume in the passenger compartment, and determine the noise level in the passenger compartment based on a volume adjustment condition of the audio output device and controls the air blow mode switchover module to switch over the active air blow mode.

BEST MODES OF CARRYING OUT THE INVENTION

Figure 1:
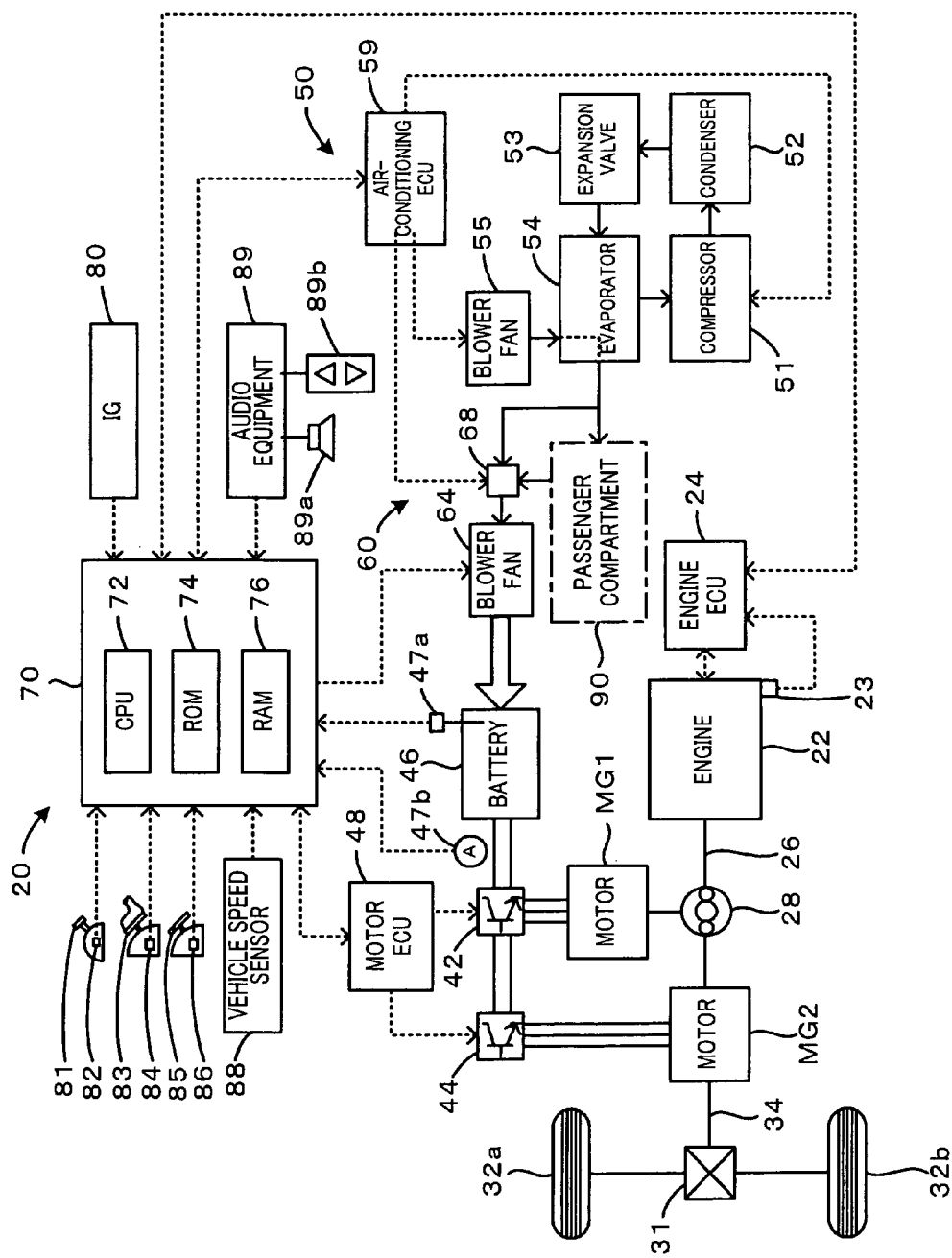
FIG. 1 schematically illustrates the configuration of a hybrid vehicle 20 in one embodiment of the invention.
Figure 2:
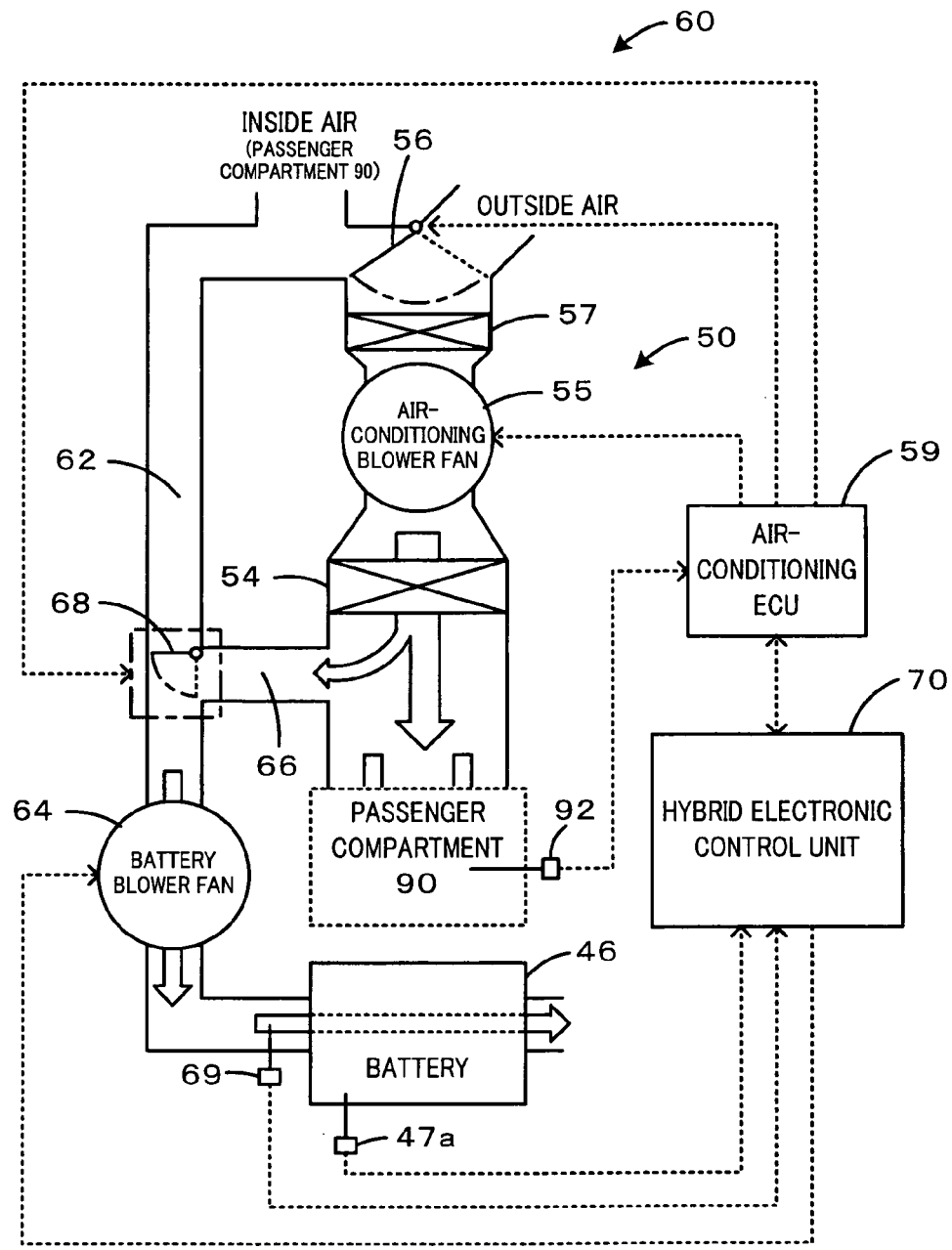
FIG. 2 shows the schematic structure of a cooling system 60 for a battery 46.

One mode of carrying out the invention is described below as a preferred embodiment with reference to the accompanied drawings. FIG. 1 schematically illustrates the configuration of a hybrid vehicle 20 in one embodiment of the invention. FIG. 2 shows the schematic structure of a cooling system 60 for a battery 46 in the embodiment. As illustrated in FIG. 1, the hybrid vehicle 20 of the embodiment has an engine 22, a planetary gear mechanism 28 having a carrier connected to a crankshaft 26 of the engine 22 and a ring gear connected to a driveshaft 34 that is linked with drive wheels 32a and 32b via a differential gear 31, a motor MG1 connected with a sun gear of the planetary gear mechanism 28 and designed to have power generation capability, a motor MG2 designed to input and output power from and to a driveshaft 34, the battery 46 arranged to transmit electric power to and from the motors MG1 and MG2 via inverters 42 and 44, an air conditioner 50 configured to condition the air in a passenger compartment 90, the cooling system 60 configured to use the air cooled down by the air conditioner 50 and thereby cool down the battery 46, audio equipment 89 incorporated in a console panel in front of the driver's seat in the passenger compartment 90 and constructed to have a tuner (not shown), a speaker 89a for audio output, and a volume control button 89b, and a hybrid electronic control unit 70 configured to control the driving system of the vehicle and the cooling system 60 of the embodiment.

The engine 22 is under operation control of an engine electronic control unit (hereafter referred to as engine ECU) 24. The operation control includes, for example, fuel injection control, ignition control, and intake air flow regulation. The engine ECU 24 inputs signals from various sensors designed to measure and detect the operating conditions of the engine 22, for example, a crank position from a crank position sensor 23 attached to the crankshaft 26 of the engine 22. The engine ECU 24 establishes communication with the hybrid electronic control unit 70 to drive and control the engine 22 in response to control signals received from the hybrid electronic control unit 70 and to output data regarding the operating conditions of the engine 22 to the hybrid electronic control unit 70 according to the requirements.

Both the motors MG1 and MG2 are driven and controlled by a motor electronic control unit (hereafter referred to as motor ECU) 48. The motor ECU 48 inputs various signals required for driving and controlling the motors MG1 and MG2, for example, signals representing rotational positions of rotors in the motors MG1 and MG2 from rotational position detection sensors (not shown) and signals representing phase currents to be applied to the motors MG1 and MG2 from current sensors (not shown). The motor ECU 48 outputs switching control signals to the inverters 42 and 44. The motor ECU 48 establishes communication with the hybrid electronic control unit 70 to drive and control the motors MG1 and MG2 in response to control signals received from the hybrid electronic control unit 70 and to output data regarding the operating conditions of the motors MG1 and MG2 to the hybrid electronic control unit 70 according to the requirements.

As shown in FIGS. 1 and 2, the air conditioner 50 has a compressor 51 configured to compress a coolant to high-temperature, high-pressure gas, a condenser 52 configured to cool down the compressed coolant with the outside air to high-pressure liquid, an expansion valve 53 configured to abruptly expand the cooled coolant to low-temperature, low-pressure mist, an evaporator 54 configured to evaporate the coolant to low-temperature, low-pressure gas by heat exchange between the low-temperature, low-pressure coolant and the air, and an air-conditioning blower fan 55 configured to blow the air cooled down by the heat exchange of the evaporator 54 to the passenger compartment 90. The air-conditioning blower fan 55 is driven to take in the air from an inside air-outside air switchover damper 56 via a filter 57 and to cool down the intake air by the evaporator 54 and blow the cooled intake air to the passenger compartment 90.

The air conditioner 50 is under control of an air-conditioning electronic control unit (hereafter referred to as air-conditioning ECU) 59. The air-conditioning ECU 59 inputs an inside temperature Tin or temperature in the passenger compartment 90 from a temperature sensor 92. The air-conditioning ECU 59 outputs driving signals to the compressor 51, to the air-conditioning blower fan 55, to the inside air-outside air switchover damper 56, and to a mode switchover damper 68 (explained below). The air-conditioning ECU 59 establishes communication with the hybrid electronic control unit 70 to drive and control air conditioner 50 in response to control signals received from the hybrid electronic control unit 70 and to output data regarding the operating conditions of the air conditioner 50 to the hybrid electronic control unit 70.

The cooling system 60 is arranged to take in the air from the passenger compartment 90 and directly blow the intake air to the battery 46, so as to cool down the battery 46 (hereafter this cooling mode is referred to as inside air intake mode). The cooling system 60 is also arranged to alternately take in the air cooled down by the evaporator 54 of the air conditioner 50 and blow the cooled intake air to the battery 46, so as to cool down the battery 46 (hereafter this cooling mode is referred to as A/C intake mode). As shown in FIG. 2, the cooling system 60 has an air conduit 62 arranged to connect the passenger compartment 90 (inside air) with the battery 46, a battery blower fan 64 provided on the air conduit 62 to blow the intake air to the battery 46, a branch pipe 66 arranged to blow part of the air flowed from the air-conditioning blower fan 55 through the evaporator 54 to the upstream of the battery blower fan 64 in the air conduit 62, and the mode switchover damper 68 provided at a joint of the air conduit 62 and the branch pipe 66 to selectively block the inside air or block the branch pipe 66.

The hybrid electronic control unit 70 is constructed as a microcomputer including a CPU 72, a ROM 74 configured to store processing programs, a RAM 76 configured to temporarily store data, input and output ports (not shown), and a communication port (not shown). The hybrid electronic control unit 70 inputs, via its input port, a battery temperature Tb or temperature of the battery 46 from a temperature sensor 47a, a charge-discharge electric current Ib from a current sensor 47b attached to an output terminal of the battery 46, an intake air temperature Tbi from a temperature sensor 69 provided in the vicinity of an entrance to the battery 46 in the air conduit 62, an ignition signal from an ignition switch 80, a gearshift position SP or a current setting position of a gearshift lever 81 from a gearshift position sensor 82, an accelerator opening Acc or the driver's depression amount of the accelerator pedal 83 from an accelerator pedal position sensor 84, a brake pedal position BP or the driver's depression amount of the brake pedal 85 from a brake pedal position sensor 86, a vehicle speed V from a vehicle speed sensor 88, and an operation signal from the volume control button 89b. The hybrid electronic control unit 70 outputs driving signals to the battery blower fan 64 and to the other relevant elements via its output port. The hybrid electronic control unit 70 makes connection with the engine ECU 24, the motor ECU 48, and the air-conditioning ECU 59 via its communication port to transmit various control signals and data to and from the engine ECU 24, the motor ECU 48, and the air-conditioning ECU 59 as mentioned previously.

Figure 3:
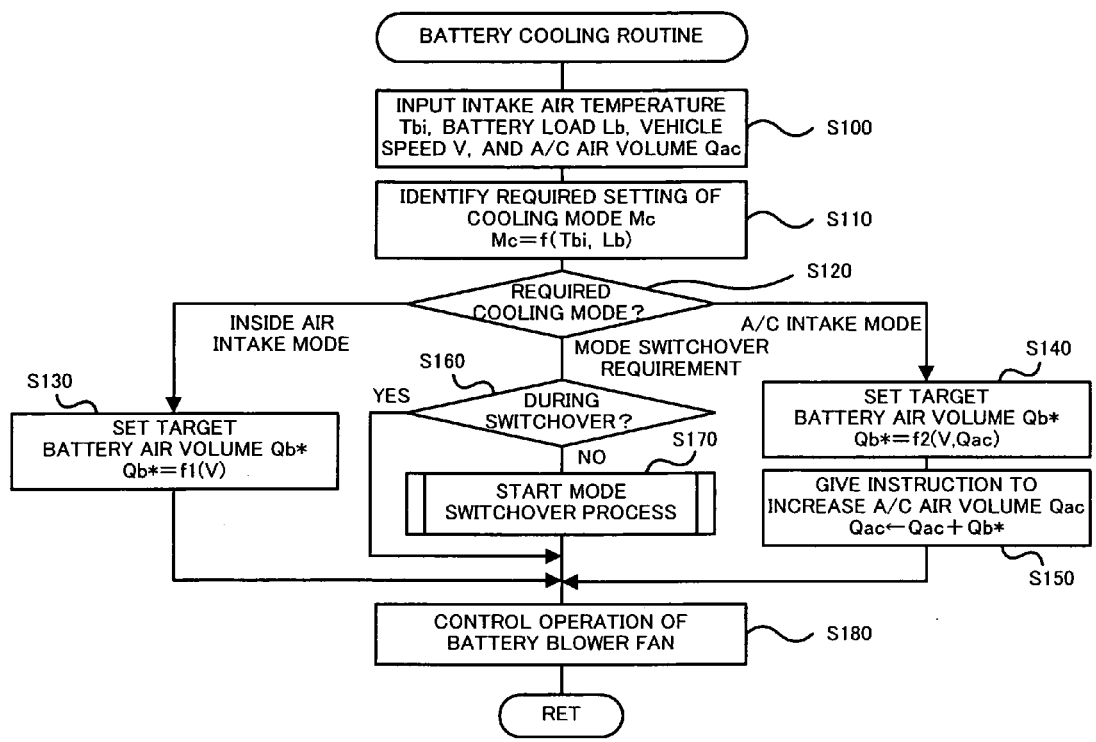
FIG. 3 is a flowchart showing a battery cooling routine executed by the hybrid electronic control unit 70.

The following describes the operations of the hybrid vehicle 20 of the embodiment having the configuration discussed above, especially a series of operations to cool down the battery 46. FIG. 3 is a flowchart showing a battery cooling routine executed by the hybrid electronic control unit 70. This routine is repeatedly performed at preset time intervals (for example, at every several ten msec) when the battery temperature Tb measured by the temperature sensor 47a is not lower than a preset reference temperature (for example, 50° C.).

In the battery cooling routine, the CPU 72 of the hybrid electronic control unit 70 first inputs various data required for control, for example, the intake air temperature Tbi from the temperature sensor 69, a battery load Lb of the battery 46, the vehicle speed V from the vehicle speed sensor 88, and an A/C air volume Qac of the air conditioner 50 (step S100). The battery load Lb of the battery 46 may be obtained by averaging a preset number of computed values of charge-discharge electric power of the battery 46 (the product of the square of the charge-discharge electric current Ib measured by the current sensor 47b and an internal resistance of the battery 46). The A/C air volume Qac of the air conditioner 50 is set based on the user's set air volume as the air flow to be blown out to the passenger compartment 90, the user's set temperature, and the inside temperature Tin from the temperature sensor 92 and is input from the air-conditioning ECU 59 by communication.

Figure 4:
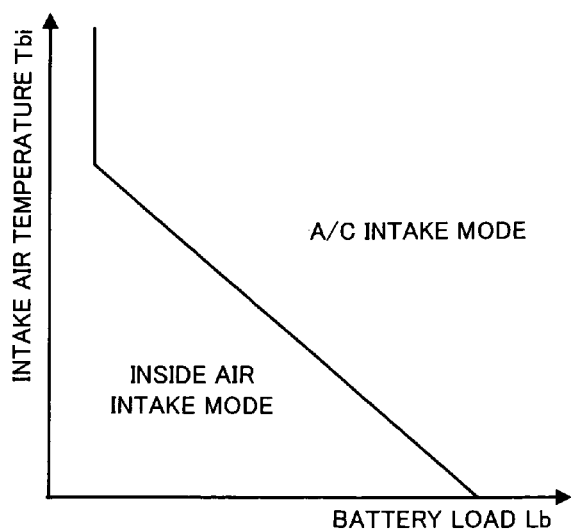
FIG. 4 shows one example of the cooling mode requirement setting map.

After the data input, the CPU 72 identifies a required setting of a cooling mode Mc, based on the input intake air temperature Tbi and the input battery load Lb (step S110). The required setting of the cooling mode Mc is identified according to the intake air temperature Thi and the battery load Lb with referring to a cooling mode requirement setting map. One example of the cooling mode requirement setting map is shown in FIG. 4. The intake air temperature Thi and the battery load Lb are parameters significantly affecting the temperature of the battery 46 (battery temperature Tb). The higher intake air temperature Tbi and the greater battery load Lb lead to a significant increase in temperature of the battery 46 and thereby require accelerated cooling of the battery 46. In this case, the required setting of the cooling mode Mc is the A/C intake mode. The lower intake air temperature Thi and the smaller battery load Lb, on the other hand, lead to a relatively small increase in temperature of the battery 46 and thereby do not require accelerated cooling of the battery 46. In this case, the required setting of the cooling mode Mc is the inside air intake mode. When the required setting of the cooling mode Mc is different from the current setting of the cooling mode Mc, there is a requirement for switching over the cooling mode Mc.

Figure 5:
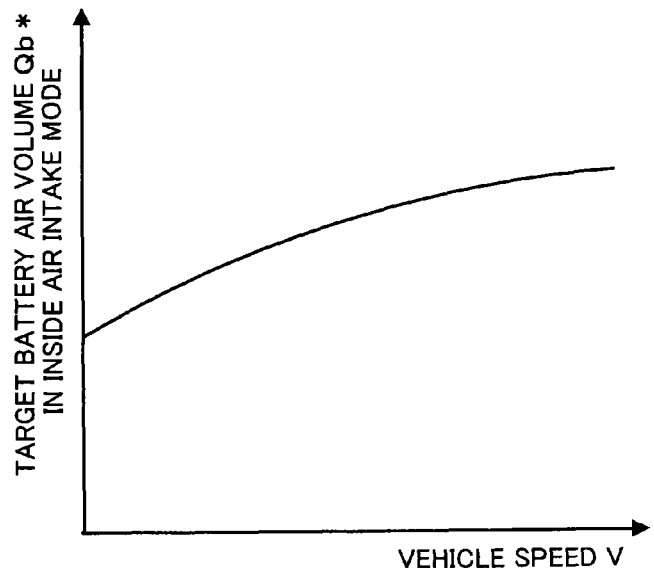
FIG. 5 is one example of a setting map of a target battery air volume $Qb^*$ in an inside air intake mode against a vehicle speed V.

When the required setting of the cooling mode Mc is the inside air intake mode (step S120), the CPU 72 sets a target battery air volume Qb* to be blown to the battery 46 based on the input vehicle speed V (step S130) and controls the operation of the battery blower fan 64 with the set target battery air volume Qb* (step S180). The battery cooling routine is then terminated. A concrete procedure of setting the target battery air volume Qb* in the inside air intake mode in this embodiment provides and stores in advance a variation in target battery air volume Qb* against the vehicle speed V as a map in the ROM 74 and reads the target battery air volume Qb* corresponding to the given vehicle speed V from the stored map. One example of this map is shown in FIG. 5. The higher vehicle speed V leads to the larger drive-related noise and gives the greater background noise to the driver and the other passengers. In general, the driver or the other passengers are not specifically informed of the operation of the battery blower fan 64. The operation of the battery blower fan 64 at a high rotation speed may thus cause the driver and the other passengers to feel odd and uncomfortable by the unexpected large driving noise. In order to effectively mask the driving noise of the battery blower fan 64 with the background noise increasing with an increase in vehicle speed V, the operation of the battery blower fan 64 is allowed to have the greater target battery air volume Qb* in the condition of the higher vehicle speed V. The battery blower fan 64 is thus driven to cool down the battery 46 in a specific range of not making the driver or the other passengers feel odd or uncomfortable.

Figure 6:
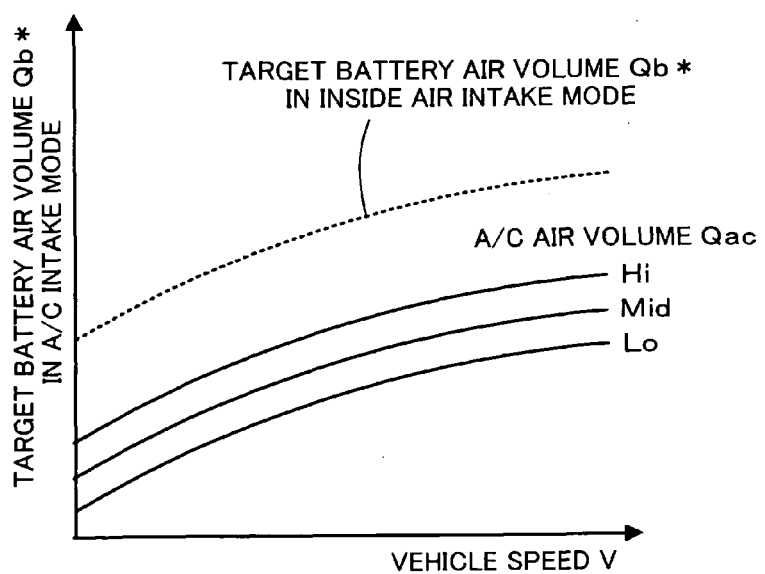
FIG. 6 is one example of a setting map of a A/C air volume Qac and the target battery air volume $Qb^*$ in an A/C intake mode against the vehicle speed V.

When the required setting of the cooling mode Mc is the A/C intake mode (step S120), on the other hand, the CPU 72 sets the target battery air volume Qb* based on the input vehicle speed V and the input A/C air volume Qac (step S140) and gives an air volume increase instruction to the air-conditioning ECU 59 to increase the A/C air volume Qac by the set target battery air volume Qb* (step S150). The CPU 72 then controls the operation of the battery blower fan 64 with the set target battery air volume Qb* (step S180) and terminates the battery cooling routine. In response to this air volume increase instruction, the air-conditioning ECU 59 operates the air-conditioning blower fan 55 with the A/C air volume Qac increased by the target battery air volume Qb*. The air blow to the battery 46 with the intake air blown by the air-conditioning blower fan 55 operated to have the increased A/C air volume Qac by the target battery air volume Qb* accordingly does not affect the air conditioning in the passenger compartment 90. A concrete procedure of setting the target battery air volume Qb*in the A/C intake mode in the embodiment provides and stores in advance variations in target battery air volume Qb* against the vehicle speed V with regard to multiple values of the A/C air volume Qac as a map in the ROM 74 and reads the target battery air volume Qb* corresponding to the given vehicle speed V and the given A/C air volume Qac from the stored map. One example of this map is shown in FIG. 6. As shown in this map, the target battery air volume Qb* in the A/C intake mode is set to be smaller than the target battery air volume Qb* in the inside air intake mode at an identical value of the vehicle speed V, because of the following reason. In the A/C intake mode, the air-conditioning blower fan 55 for the air conditioner 50 is driven with the A/C air volume Qac increased by the target battery air volume Qb*. The driving noise of the air-conditioning blower fan 55 is thus greater than the driving noise of the battery blower fan 64 in the A/C intake mode. This increases the potential of making the driver and the other passengers feel odd and uncomfortable.

Figure 7:
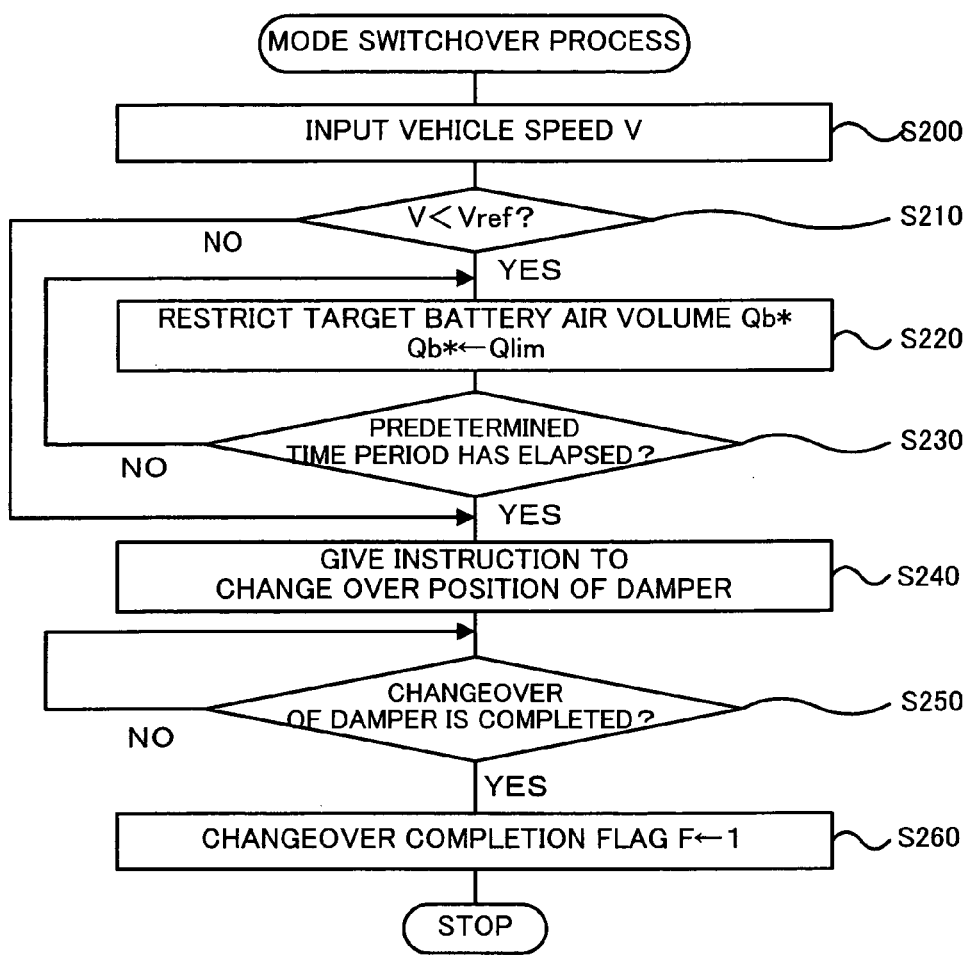
FIG. 7 is a flowchart showing the mode switchover process.

In response to a switchover requirement for switching over the cooling mode Mc at step S120, when a switchover of the cooling mode Mc is not currently being done (step S160), the CPU 72 starts a mode switchover process (step S170). The CPU 72 then controls the operation of the battery blower fan 64 (step S180) and terminates the battery cooling routine. FIG. 7 is a flowchart showing the mode switchover process executed in parallel to the battery cooling routine by the hybrid electronic control unit 70 in the embodiment. The details of the mode switchover process are explained below.

In the mode switchover process, the CPU 72 of the hybrid electronic control unit 70 first inputs the vehicle speed V (step S200) and compares the input vehicle speed V with a preset reference speed Vref (step S210). The reference speed Vref is experimentally set as a vehicle speed criterion of sufficiently masking the potential wind roar in the course of a changeover of the position of the mode switchover damper 68 with the drive-related noise. When the vehicle speed V is not lower than the preset reference speed Vref, the CPU 72 gives an instruction to the air-conditioning ECU 59 to immediately change over the position of the mode switchover damper 68 (step S240). The CPU 72 waits for completion of the position changeover of the mode switchover damper 68 (step S250) and sets a changeover completion flag F to 1 (step S260). The mode switchover process is then terminated. The higher vehicle speed V leads to the larger drive-related noise (the greater background noise). The wind roar or unusual noise potentially occurring in the course of the position changeover of the mode switchover damper 68 is thus effectively masked with the background noise and desirably prevents the driver and the other passengers from feeling odd and uncomfortable. One procedure of identifying completion of the position changeover of the mode switchover damper 68 determines whether a predetermined time period slightly longer than a required time generally required for the position changeover of the mode switchover damper 68 has been elapsed. Another procedure uses a sensor for detecting the position of the mode switchover damper 68 and identifies completion of the position changeover of the mode switchover damper 68 based on a signal output from the sensor. In response to the setting of the changeover completion flag F to 1, it is identified that the switchover of the cooling mode Mc is completed. Until a next switchover requirement for switching over the cooling mode Mc at step S120, in response to the switchover of the cooling mode Mc to the inside air intake mode, the battery cooling routine of FIG. 3 goes to the processing flow of and after step S130. In response to the switchover of the cooling mode Mc to the A/C intake mode, the battery cooling routine of FIG. 3 goes to the processing flow of and after step S140.

When the vehicle speed V is lower than the preset reference speed Vref, on the other hand, the CPU 72 restricts the target battery air volume Qb* of the battery blower fan 64 to a preset limit level Qlim (step S220). The CPU 72 waits for elapse of a predetermined time period required for lowering the actual air volume of the air blow to the battery 46 to the preset limit level Qlim (step S230) and gives an instruction to the air-conditioning ECU 59 to change over the position of the mode switchover damper 68 (step S240). The CPU 72 waits for completion of the position changeover of the mode switchover damper 68 (step S250) and sets the changeover completion flag F to 1 (step S260). The mode switchover process is then terminated. The limit level Qlim is experimentally set as an air volume criterion for reducing the potential wind roar occurring in the course of a position changeover of the mode switchover damper 68 to a specific range of presenting the driver and the other passengers from feeling odd and uncomfortable. When the drive-related noise (background noise) is too small to sufficiently mask the wind roar occurring in the course of the position changeover of the mode switchover damper 68, the target battery air volume Qb* of the battery blower fan 64 is restricted to reduce the potential wind roar occurring in the course of the position changeover of the mode switchover damper 68 and thereby prevents the driver and the other passengers from feeling odd and uncomfortable.

Figure 8:
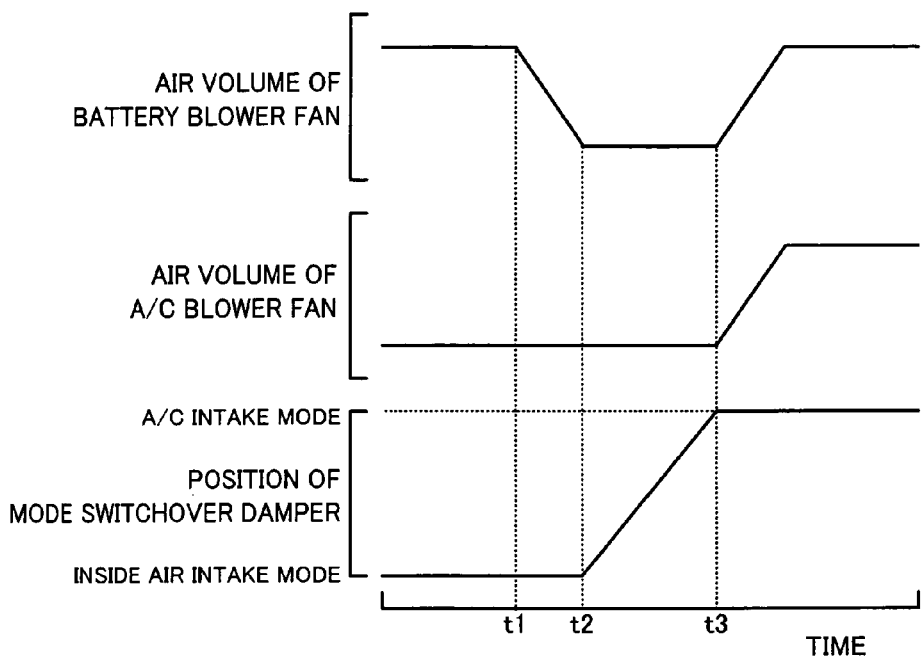
FIG. 8 shows time changes of the air volume of a battery blower fan 64, the air volume of an air-conditioning blower fan 55, and the position of a mode switchover damper 68 in the case of a switchover of the cooling mode from the inside air intake mode to the A/C intake mode at the vehicle speed V of lower than a preset reference speed Vref.
Figure 9:
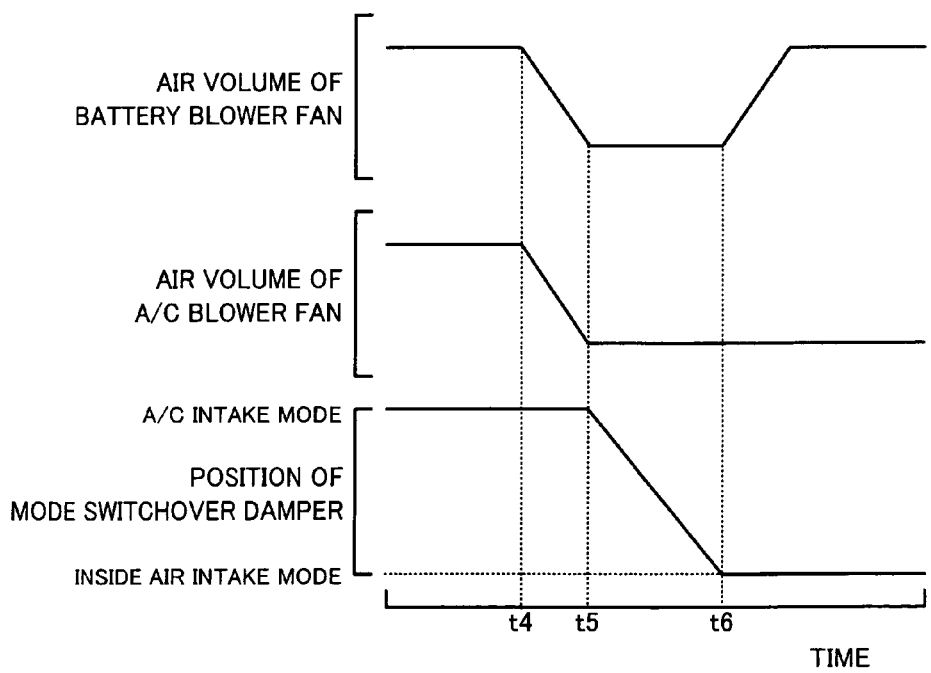
FIG. 9 shows time changes of the air volume of the battery blower fan 64, the air volume of the air-conditioning blower fan 55, and the position of the mode switchover damper 68 in the case of a switchover of the cooling mode from the A/C intake mode to the inside air intake mode at the vehicle speed V of lower than the preset reference speed Vref.

FIG. 8 shows time changes of the air volume of the battery blower fan 64, the air volume of the air-conditioning blower fan 55, and the position of the mode switchover damper 68 in the case of a switchover of the cooling mode from the inside air intake mode to the A/C intake mode at the vehicle speed V of lower than the preset reference speed Vref. FIG. 9 shows time changes of the air volume of the battery blower fan 64, the air volume of the air-conditioning blower fan 55, and the position of the mode switchover damper 68 in the case of a switchover of the cooling mode from the A/C intake mode to the inside air intake mode at the vehicle speed V of lower than the preset reference speed Vref. In the time chart of FIG. 8, in response to a switchover requirement of the cooling mode from the inside air intake mode to the A/C intake mode at a time t1, the target battery air volume Qb* of the battery blower fan 64 is restricted to the preset limit level Qlim. At a time t2, a changeover operation starts to change over the position of the mode switchover damper 68 to the A/C intake mode. On completion of the position changeover of the mode switchover damper 68 at a time t3, the air blow to the battery 46 in the A/C intake mode starts with release of the restriction of the target battery air volume Qb*. In the time chart of FIG. 9, in response to a switchover requirement of the cooling mode from the A/C intake mode to the inside air intake mode at a time t4, the target battery air volume Qb* of the battery blower fan 64 is restricted to the preset limit level Qlim, while the increase of the A/C air volume Qac by the target battery air volume Qb* is cancelled. At a time t5, a changeover operation starts to change over the position of the mode switchover damper 68 to the inside air intake mode. On completion of the position changeover of the mode switchover damper 68 at a time t6, the air blow to the battery 46 in the inside air intake mode starts with release of the restriction of the target battery air volume Qb*.

As described above, the hybrid vehicle 20 of the embodiment switches over the cooling mode Mc between the inside air intake mode and the A/C intake mode by changing over the position of the mode switchover damper 68. The position changeover of the mode switchover damper 68 selectively disconnects either the air conduit 62 in the inside air intake mode of taking in the air in the passenger compartment 90 and directly blowing the intake air to the battery 46 or the branch pipe 66 in the A/C intake mode of taking in the air cooled down by the air conditioner 50 and blowing the cooled intake air to the battery 46. In response to a switchover requirement of the cooling mode Mc, the air volume of the battery blower fan 64 (target battery air volume Qb*) is restricted to the preset limit level Qlim, prior to the changeover of the position of the mode switchover damper 68. Such control reduces the potential wind roar occurring in the course of a position changeover of the mode switchover damper 68 and thus effectively prevents the driver and the other passengers from feeling odd and uncomfortable. At the vehicle speed V of not lower than the preset reference speed Vref, the position changeover of the mode switchover damper 68 is controlled to immediately switch over the cooling mode Mc. Such control sufficiently masks the unusual noise, such as the wind roar, potentially occurring in the course of a position changeover of the mode switchover damper 68 with the drive-related noise and thus effectively prevents the driver and the other passengers from feeling odd and uncomfortable.

When the vehicle speed V is lower than the preset reference speed Vref, in response to a switchover requirement of the cooling mode Mc, the hybrid vehicle 20 of the embodiment restricts the target battery air volume Qb* of the battery blower fan 64 to the preset limit level Qlim, prior to the changeover of the position of the mode switchover damper 68. When the vehicle speed V is not lower than the preset reference speed Vref, on the other hand, in response to a switchover requirement of the cooling mode Mc, the hybrid vehicle 20 of the embodiment immediately changes over the position of the mode switchover damper 68. Such conditional restriction of the target battery air volume Qb* is, however, not restrictive. One modification may unconditionally restrict the target battery air volume Qb* of the battery blower fan 64 to the preset limit level Qlim, independently of the vehicle speed V, prior to the changeover of the position of the mode switchover damper 68.

The hybrid vehicle 20 of the embodiment uses the vehicle speed V as a parameter reflecting the noise in the passenger compartment 90 (background noise) or a noise estimation parameter. The vehicle speed V may be replaced by any other suitable parameter reflecting the noise in the passenger compartment 90 (background noise). Available examples of the parameter reflecting the noise in the passenger compartment 90 (background noise) include a rotation speed Ne of the engine 22 computed from a signal representing the crank position detected by the crank position sensor 23, a volume level adjusted by the volume control button 89*b* of the audio equipment 89, and a noise level actually detected by a microphone located in the passenger compartment 90.

The hybrid vehicle 20 of the embodiment identifies the required setting of the cooling mode Mc, based on the intake air temperature Tbi and the battery load Lb. The required setting of the cooling mode Mc may be identified based on only the intake air temperature Tbi, based on only the battery load Lb, or based on another suitable parameter, for example, the battery temperature Tb or its increase rate.

In the hybrid vehicle 20 of the embodiment, the cooling system 60 has the inside air intake mode of taking in the air in the passenger compartment 90 and directly blowing the intake air to the battery 46 and the A/C intake mode of taking in the air cooled down by the air conditioner 50 (evaporator 54) and blowing the cooled intake air to the battery 46, as the available options of the cooling mode Mc. The available options of the cooling mode Mc are, however, not restricted to these modes. The technique of the invention is applicable to any cooling system having at least two different modes of taking in the air from different locations and blowing the intake air to the battery. The available options of the cooling mode Mc may include an outside air intake mode of taking in the outside air and blowing the intake air to the battery or a trunk room air intake mode of taking in the air in a vehicle trunk room and blowing the intake air to the battery.

The embodiment regards the cooling system 60 as one application of the invention to cool down the battery 46, which is arranged to transmit electric power to and from the motors MG1 and MG2 in the hybrid vehicle 20 equipped with the engine 22, the planetary gear mechanism 28, and the motors MG1 and MG2. This is, however, not restrictive in any sense. The cooling system of the invention may be applied to cool down a battery or another accumulator arranged to transmit electric power to and from a driving motor in a hybrid vehicle of another configuration or may be applied to cool down a battery or another accumulator arranged to transmit electric power to and from a motor in an electric vehicle equipped with only the motor as the driving power source. The cooling system of the invention may also be applied to cool down an accumulator used for an auto start in a motor vehicle having engine auto stop and auto start functions.

The embodiment and its modified examples discussed above are to be considered in all aspects as illustrative and not restrictive. There may be many other modifications, changes, and alterations without departing from the scope or spirit of the main characteristics of the present invention.

Industrial Applicability

The technique of the present invention is preferably applied to the manufacturing industries of the cooling systems and the motor vehicles.

The invention claimed is:

1. A cooling system for cooling down an accumulator mounted on a motor vehicle, the cooling system comprising:
   an air blower configured to have multiple air blow modes of taking in an intake air from different air flow paths within the cooling system and blowing the intake air to the accumulator;
   an air blow mode switchover module configured to changeover a status of each air flow path within the cooling system between an open position and a closed position in each of the multiple air blow modes to thereby switch over to an active air blow mode from among the multiple air blow modes;
   a noise level detection-estimation module configured to detect or estimate a noise level in a passenger compartment of the motor vehicle; and
   a controller configured, in response to a switch over demand of the active air blow mode during air blow to the accumulator, to perform an air blow restriction changeover control in a case that the detected or estimated noise level is less than a preset reference level, while controlling the air blow mode switchover module to switch over to the active air blow mode without restriction of the air blow to the accumulator in a case that the detected or estimated noise level is not less than the preset reference level, wherein
   the air blow restriction changeover control sequentially controls: i) the air blower to restrict the air blow to the accumulator, ii) the air blow mode switchover module to switch over to the active air blow mode after restriction of the air blow to the accumulator, and iii) the air blower to release the restriction of the air blow to the accumulator after the switch over to the active air blow mode by the air blow mode switchover module, and
   when a detected speed of the motor vehicle is not lower than a reference speed, a position of a damper is immediately changed over, and
   when a detected speed of the motor vehicle is lower than the reference speed, the air blower speed is restricted to a preset level, prior to changing over the position of the damper.

2. The cooling system in accordance with claim 1, wherein
   the cooling system is mounted on a motor vehicle equipped with an internal combustion engine,
   the noise level detection-estimation module has an engine rotation speed detector configured to detect a rotation speed of the internal combustion engine, and
   the noise level detection-estimation module detects or estimates the noise level in the passenger compartment, based on the detected rotation speed of the internal combustion engine.

3. The cooling system in accordance with claim 1, wherein
   the cooling system is mounted on a motor vehicle equipped with an audio output module configured to output sound with an adjustable volume in the passenger compartment, and
   the noise level detection-estimation module detects or estimates the noise level in the passenger compartment, based on a volume adjustment condition of the audio output module.

4. The cooling system in accordance with claim 1, wherein
   the motor vehicle is equipped with an air conditioner configured to condition air in the passenger compartment of the motor vehicle, and
   the multiple air blow modes include a first air blow mode of taking in the air inside or outside of the passenger compartment of the motor vehicle and directly blowing the intake air to the accumulator and a second air blow mode of taking in the air cooled down by the air conditioner and blowing the cooled intake air to the accumulator.

5. The cooling system in accordance with claim 1, further comprising:
   a temperature-relevant parameter detector configured to detect a temperature-relevant parameter reflecting a temperature of the accumulator, wherein
   the switch over demand of the active air blow mode is made based on the detected temperature-relevant parameter.

6. A method for controlling a cooling system, the cooling system including an air blower provided to have multiple air blow modes of taking in an intake air from different air flow paths within the cooling system and blowing the intake air to an accumulator mounted on a motor vehicle; and an air blow mode switchover module configured to changeover a status of each air flow path within the cooling system between an open position and a closed position in each of the multiple air blow modes to thereby switch over to an active air blow mode from among the multiple air blow modes, the method comprising:
   in response to a switch over demand of the active air blow mode during air blow to the accumulator, the method performs an air blow restriction changeover control in a case that a noise level in a passenger compartment of the motor vehicle is less than a preset reference level, while controlling the air blow mode switchover module to switch over to the active air blow mode without restriction of the air blow to the accumulator in a case that the noise level in the passenger compartment is not less than the preset reference level, wherein the air blow restriction changeover control sequentially controls: i) the air blower to restrict the air blow to the accumulator, ii) the air blow mode switchover module to switch over to the active air blow mode after restriction of the air blow to the accumulator, and iii) the air blower to release the restriction of the air blow to the accumulator after the switch over of the active air blow mode by the air blow mode switchover module, when a detected speed of the motor vehicle is not lower than a reference speed, a position of a damper is immediately changed over, and when a detected speed of the motor vehicle is lower than the reference speed, the air blower speed is restricted to a preset level, prior to changing over the position of the damper.

7. The method in accordance with claim 6, wherein the method performs the controlling in a motor vehicle equipped with an internal combustion engine, and the control method determines the noise level in the passenger compartment based on a rotation speed of the internal combustion engine and controls the air blow mode switchover module to switch over to the active air blow mode.

8. The method in accordance with claim 6, wherein the method performs the controlling in a motor vehicle equipped with an audio output device configured to output sound with an adjustable volume in the passenger compartment, and the method determines the noise level in the passenger compartment based on a volume adjustment condition of the audio output device and controls the air blow mode switchover module to switch over to the active air blow mode.

* * * * *